US009588738B2

(12) United States Patent
Cuomo et al.

(10) Patent No.: US 9,588,738 B2
(45) Date of Patent: Mar. 7, 2017

(54) SUPPORTING SOFTWARE APPLICATION DEVELOPERS TO ITERATIVELY REFINE REQUIREMENTS FOR WEB APPLICATION PROGRAMMING INTERFACES

(71) Applicant: International Business Machines Corporation, Armonk, NY (US)

(72) Inventors: Gennaro A. Cuomo, Durham, NC (US); Hani T. Jamjoom, Cos Cob, CT (US); Jim A. Laredo, Katonah, NY (US); Arjun Natarajan, Old Tappan, NJ (US); Shriram Rajagopalan, White Plains, NY (US); Daniel J. Williams, Ithaca, NY (US); John E. Wittern, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/623,156

(22) Filed: Feb. 16, 2015

(65) Prior Publication Data
US 2016/0239269 A1   Aug. 18, 2016

(51) Int. Cl.
*G06F 9/44* (2006.01)
*H04L 29/06* (2006.01)
(Continued)

(52) U.S. Cl.
CPC ............. *G06F 8/10* (2013.01); *G06F 8/20* (2013.01); *G06F 17/3053* (2013.01);
(Continued)

(58) Field of Classification Search
None
See application file for complete search history.

(56) References Cited

U.S. PATENT DOCUMENTS 5,542,078 A   7/1996 Martel et al.
5,870,559 A   2/1999 Leshem et al.
(Continued)

FOREIGN PATENT DOCUMENTS

EP    0948225 B1   7/2008
WO    2008111051 A2   9/2008
(Continued)

OTHER PUBLICATIONS

Dojchinovski et al., "Personalised Graph-Based Selection of Web APIs," 2012, The Semantic Web—ISWC 2012, vol. 7649 of the series Lecture Notes in Computer Science, pp. 34-48.*
(Continued)

*Primary Examiner* — Tuan Q. Dam
*Assistant Examiner* — Stephen Berman
(74) *Attorney, Agent, or Firm* — Yee & Associates, P.C.; Louis Percello

(57) ABSTRACT

Providing Web API recommendations for a context of an application is provided. A ranked list of recommended Web APIs and a set of Web API recommendations regarding the context of the application is sent to a client device via a network. In response to determining that a selection of a set of Web APIs in the ranked list of recommended Web APIs was received, the selected set of Web APIs is added to the context of the application to generate a new context of the application. A display of a relationship among the set of added Web APIs to the new context of the application is sent to the client device via the network.

12 Claims, 5 Drawing Sheets

(51) Int. Cl.
*G06F 17/30* (2006.01)
*H04L 29/08* (2006.01)

(52) U.S. Cl.
CPC .. *G06F 17/30528* (2013.01); *G06F 17/30554* (2013.01); *G06F 17/30604* (2013.01); *G06F 17/30864* (2013.01); *G06F 17/30867* (2013.01); *H04L 67/42* (2013.01); *H04L 67/02* (2013.01)

(56) References Cited

U.S. PATENT DOCUMENTS

| | | | |
|---|---|---|---|
| 7,058,655 B2 | 6/2006 | Goldberg et al. | |
| 8,074,160 B2 | 12/2011 | Fry et al. | |
| 8,458,596 B1* | 6/2013 | Malks | G06Q 10/06 715/742 |
| 9,037,964 B2* | 5/2015 | Appleyard | G06Q 10/10 715/234 |
| 2003/0135503 A1 | 7/2003 | Goldberg et al. | |
| 2007/0104100 A1 | 5/2007 | Davey et al. | |
| 2008/0097941 A1* | 4/2008 | Agarwal | G06N 99/005 706/12 |
| 2008/0209451 A1 | 8/2008 | Michels et al. | |
| 2008/0221867 A1 | 9/2008 | Schreiber | |
| 2009/0006152 A1 | 1/2009 | Timmerman et al. | |
| 2009/0204594 A1* | 8/2009 | Akkiraju | G06F 8/34 |
| 2009/0235285 A1 | 9/2009 | Kim et al. | |
| 2012/0016653 A1* | 1/2012 | Bhandar | G06F 8/10 703/22 |
| 2012/0047130 A1* | 2/2012 | Perez | G06F 8/34 707/723 |
| 2012/0054065 A1 | 3/2012 | Sung et al. | |
| 2012/0159441 A1* | 6/2012 | Ghaisas | G06F 8/10 717/123 |
| 2013/0159960 A1* | 6/2013 | Sivaramakrishnan | G06F 8/20 717/100 |
| 2013/0332473 A1 | 12/2013 | Ryman | |
| 2014/0090020 A1 | 3/2014 | Meiners et al. | |
| 2014/0114805 A1 | 4/2014 | Akolkar et al. | |
| 2014/0180868 A1 | 6/2014 | Kanigsberg et al. | |
| 2014/0310302 A1 | 10/2014 | Wu et al. | |
| 2014/0359553 A1* | 12/2014 | Park | G06F 8/20 717/101 |
| 2014/0379885 A1 | 12/2014 | Krishnamurthy et al. | |
| 2015/0074672 A1 | 3/2015 | Yeddanapudi et al. | |
| 2015/0121401 A1 | 4/2015 | Laredo et al. | |
| 2015/0149484 A1* | 5/2015 | Kelley | G06F 17/30398 707/748 |
| 2015/0268949 A1* | 9/2015 | Huber | G06F 17/3089 717/120 |
| 2015/0363492 A1 | 12/2015 | Laredo et al. | |
| 2015/0363493 A1 | 12/2015 | Laredo et al. | |
| 2015/0378692 A1* | 12/2015 | Dang | G06F 8/36 717/106 |

FOREIGN PATENT DOCUMENTS

| | | |
|---|---|---|
| WO | 2013056104 A1 | 4/2013 |
| WO | 2013096506 A1 | 6/2013 |

OTHER PUBLICATIONS

Lee et al., "Automatic Web API Composition for Semantic Data Mashups," 2012, 2012 Fourth International Conference on Computational Intelligence and Communication Networks, pp. 954-957.*

Bianchini et al., "A Recommendation System for SemanticMashup Design," 2010, 2010 Workshops on Database and Expert Systems Applications, pp. 159-163.*

Cuomo et al., "Supporting Software Application Developers to Iteratively Refine Requirements for Web Application Programming Interfaces," U.S. Appl. No. 14/743,171, filed Jun. 18, 2015, 31 pages.

List of IBM Patents or Patent Applications Treated as Related, 2 pages.

Office Action, dated Jan. 22, 2016, regarding U.S. Appl. No. 14/180,686, 33 pages.

Office Action, dated Mar. 2, 2016, regarding U.S. Appl. No. 14/302,517, 31 pages.

Lim et al., "App Epidemics: Modelling the Effects of Publicity in a Mobile App Ecosystem," Artificial Life, vol. 13, Jul. 2012, pp. 202-209.

Nguyen et al., "A Graph-based Approach to API Usage Adaptation," Proceedings of the ACM International Conference on Object Oriented Programming Systems Languages and Applications (OOPSLA '10), Oct. 2010, pp. 302-321.

Weiss et al., "Modeling the mashup ecosystem: structure and growth," R&D Management, vol. 40, No. 1, Jan. 2010, pp. 40-49.

Notice of Allowance, dated Apr. 12, 2016, regarding U.S. Appl. No. 14/180,686, 15 pages.

Notice of Allowance, dated Apr. 20, 2016, regarding U.S. Appl. No. 14/302,517, 9 pages.

Akolkar et al., "Automatic Modification of Requirements Based on Consumption and Market Changes," U.S. Appl. No. 14/563,104, filed Dec. 8, 2014, 36 pages.

List of IBM Patents or Patent Applications Treated as Related, 1 page.

Laredo et al., "Graph Based Data Model for API Ecosystem Insights," U.S. Appl. No. 14/180,686, filed Feb. 14, 2014, 43 pages.

Laredo et al., "Use of Collected Data for Web API Ecosystem Analytics," U.S. Appl. No. 14/302,517, filed Jun. 12, 2014, 47 pages.

Laredo et al., "Continuous Collection of Web API Ecosystem Data," U.S. Appl. No. 14/302,756, filed Jun. 12, 2014, 34 pages.

"Cluster analysis," Wikipedia Foundation, Inc., dated Jan. 16, 2014, 17 pages. Accessed Jan. 18, 2014, en.wikipedia.org/wiki/Cluster_analysis.

"Graph Based Recommendation Systems at eBay," Planet Cassandra, Mar. 25, 2013, 18 pages. Accessed Jan. 15, 2014, http://www.slideshare.net/planetcassandra/e-bay-nyc.

"Web API," Wikipedia Foundation, Inc., dated Dec. 7, 2013, 2 pages. Accessed Jan. 14, 2014, en.wikipedia.org/wiki/Web_API.

Belhajjame et al., "PROV-O: The PROV Ontology," W3C, Apr. 30, 2013, 71 pages. Accessed Feb. 10, 2014, http://www.w3.org/TR/prov-o/.

Cohen et al, "A Comparison of String Distance Metrics for Name-Matching Tasks," Proceedings of the Eighteenth International Joint Conference on Artificial Intelligence (IJCARI-03) Workshop on Information Integration, Aug. 2003, pp. 73-78.

Dojchinowski et al., "Personalised Graph-Based Selection of Web APIs," In the Semantic Web—ISWC, Nov. 2012, pp. 34-48.

Foggia et al, "A Graph-Based Clustering Method and Its Applications," Advances in Brain, Vision, and Artificial Intelligence, Jan. 2007, pp. 277-287.

Gantner et al., "RPG: APIs," IBM Redbooks, Dec. 2007, pp. 1-78.

Georgescu, "WSRP-Enabled Distributed Data Mining Services Deliverable over a Knowledge-Driven Portal," Proceedings of the 7th WSEAS International Conference on Applied Computer & Applied Computational Science, Apr. 2008, pp. 150-155.

Huang et al., "Service Recommendation in an Evolving Ecosystem—A Link Prediction Approach," IEEE 20th International Conference on Web Services (ICWS), Jun.-Jul. 2013, pp. 507-514.

Kawaji et el., "Graph-based clustering for finding distant relationships in a large set of protein sequences," Bioinformatics, vol. 20, No. 2, Jan. 2004, pp. 243-252.

Lee et al., "A Generic Graph-based Multidimensional Recommendation Framework and Its Implementations," Proceedings of the 21st International Conference Companion on world Wide Web, Apr. 2012, pp. 161-165.

Moore et al., "WebSphere Business Integration Server Foundation Using the Programming API and the Common Event Infrastructure," IBM Redbooks, Apr. 2005, 240 pages.

Popov, "Release Update: The new Apiphany Analytics System is here!," Apiphany, Apr. 9, 2013, 4 pages. Accessed Feb. 10, 2014, http://apiphany.com/blog/release-update-the-new-apiphany-analytics-system-is-here.

(56) References Cited

OTHER PUBLICATIONS

Rodriguez, "A Graph-Based Movie Recommender Engine," Sep. 22, 2011, 12 pages. Accessed Jan. 15, 2014, http://markorodriguez.com/2011/09/22/a-graph-based-movie-recommender-engine/.

Schaeffer, "Graph clustering," Computer Science Review, vol. 1, No. 1, Aug. 2007, pp. 27-64. geza.kzoo.edu/~erdi/patent/Schaeffer07.

Torres et al., "Improving Web API Discovery by Leveraging Social Information," IEEE International Conference on Web Services (ICWS), Jul. 2011, pp. 744-745.

Wang et al., "Graph-Based Recommendation on Social Networks," IEEE 12th International Asia-Pacific Web Conference (APWEB), Apr. 2010, pp. 116-122.

Wittern et al., "A Graph-based Data Model for API Ecosystem Insights," Proceedings of the 21 IEEE International Conference on Web Services (ICWS), Jun.-Jul. 2014, 8 pages.

Xu et al., "A Model-based Approach to Attributed Graph Clustering," Proceedings of the 2012 ACM SIGMOD International Conference on Management of Data, May 2012, 12 pages.

Zhong et al., "MAPO: Mining and Recommending API Usage Patterns," Genoa Proceedings of the 23rd European Conference on ECOOP, Jul. 2009, 25 pages.

Zhou et al., "Graph Clustering Based on Structural/Attribute Similarities," Proceedings of the VLDB Endowment, Aug. 2009, 12 pages.

Bianchini et al., "A Multi-perspective Framework for Web API Search in Enterprise Mashup Design," Advanced Information Systems Engineering, Jan. 2013, pp. 353-368.

Office Action, dated May 20, 2016, regarding U.S. Appl. No. 14/743,171, 42 pages.

"Unity Ecosystem Manager Event System API Reference," Teradata Labs, Release 14.10, B035-3204-014K, Jan. 2014, 88 pages.

Office Action, dated Nov. 9, 2016, regarding U.S. Appl. No. 14/302,756, 46 pages.

Notice of Allowance, dated Oct. 21, 2016, regarding U.S. Appl. No. 14/743,171, 16 pages.

\* cited by examiner

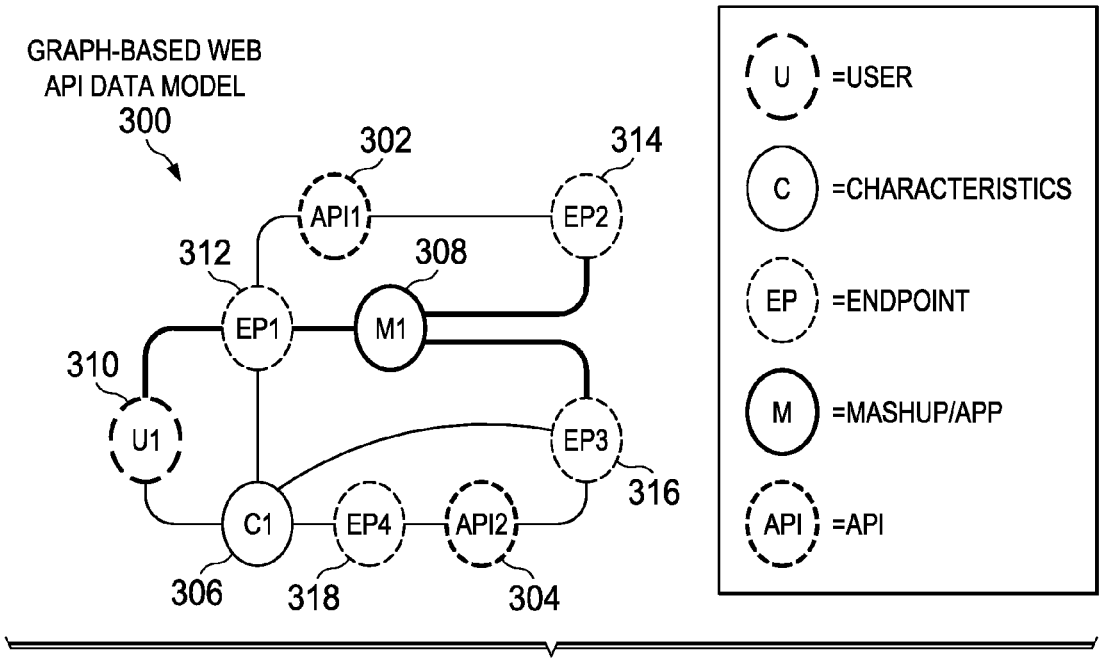

FIG. 3

WEB API NODE DATA
400

```
402 ~ {
404 ~  baseUrl: "http://api.company/api/",
406 ~  creationDate: 1262494800000,
        customId: "company",
        description: "The company web site is in German but appears to be a
        database of articles on the latest IT news. The API uses a RESTful
408 {   interface to allow users to search and retrieve both articles and videos in a
        variety of ways or access article and video metadata. Responses are
        formatted in either XML or JSON.",
410 ~  name: "company",
412 ~  type: "API",
414 ~  _id: 8102656,
416 ~  _type: "vertex"
       }
```

FIG. 4

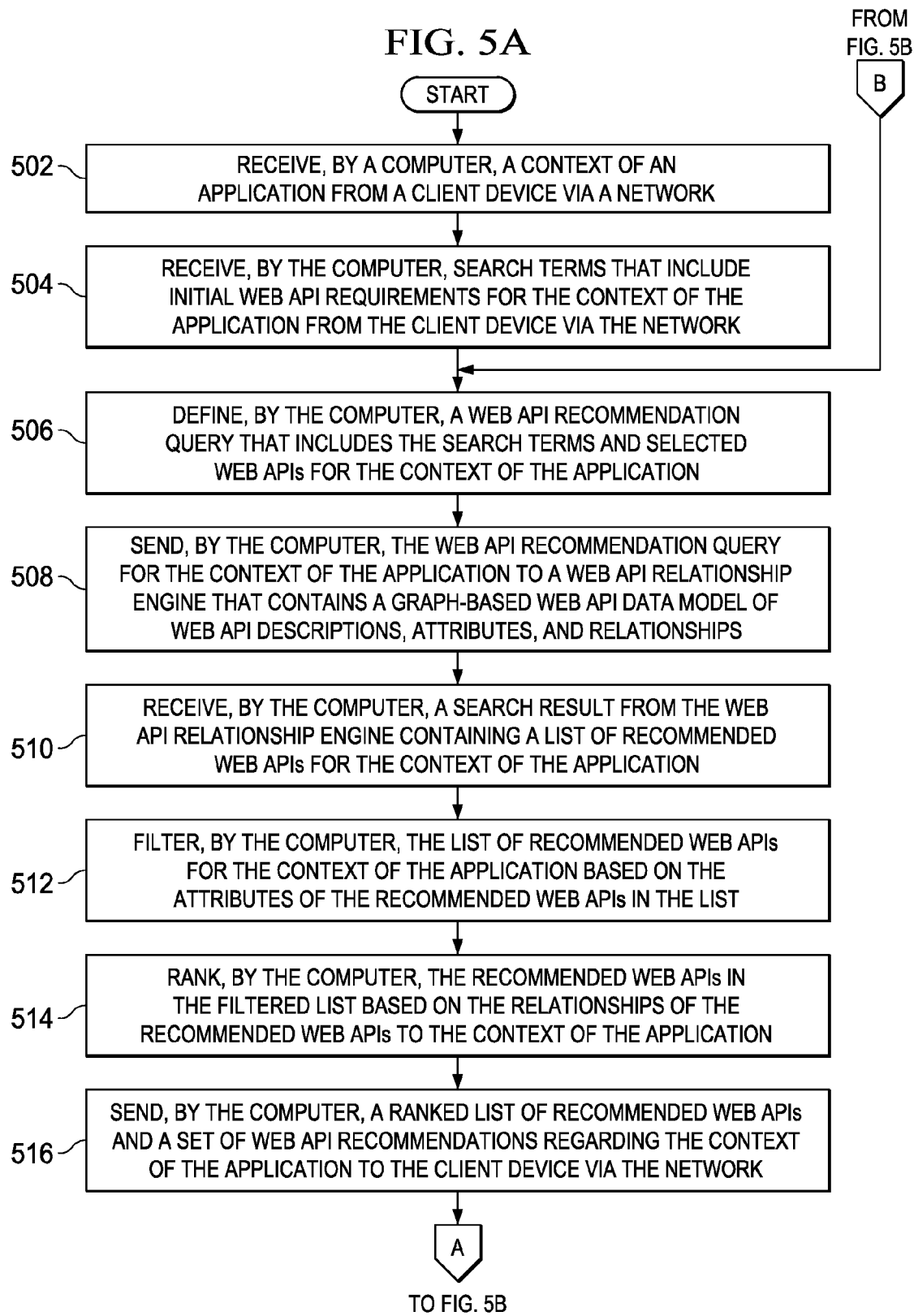

SUPPORTING SOFTWARE APPLICATION DEVELOPERS TO ITERATIVELY REFINE REQUIREMENTS FOR WEB APPLICATION PROGRAMMING INTERFACES

BACKGROUND

1. Field

The disclosure relates generally to Web application programming interfaces and more specifically to supporting software application developers to iteratively refine requirements for Web application programming interfaces (Web APIs).

2. Description of the Related Art

An application programming interface (API) is a set of routines, protocols, and tools for building software applications. An API makes it easier for software developers to develop a software application by providing basic building blocks. These basic building blocks provide functions and sets of attributes associated with those functions including behavior and execution of those functions. A software developer then puts the basic building blocks together to create the software application. In essence, a software application's API defines the proper way for the software developer to request services from that software application. A Web API makes these services available through the Web to a potentially large set of consuming applications.

Web APIs may be used for accessing a Web-based software service. Multiple Web APIs may be composed to accomplish a function unbeknownst to an end user. For example, when an end user buys movie tickets online and enters credit card information, the movie ticket Web site uses a Web API to send the credit card information to a remote software application that verifies whether the credit card information is correct. Once payment is confirmed, the remote software application sends a response back to the movie ticket Web site indicating that the move ticket Web site may issue the tickets to the end user. The end user only sees the movie ticket Web site interface, but behind the scenes many software applications are working together using different Web APIs to provide the Web-based software service. Thus, Web-based software service applications may be based on many different Web APIs from multiple sources.

SUMMARY

According to one illustrative embodiment, a computer-implemented method for providing Web API recommendations for a context of an application is provided. A computer sends a ranked list of recommended Web APIs and a set of Web API recommendations regarding the context of the application to a client device via a network. In response to the computer determining that a selection of a set of Web APIs in the ranked list of recommended Web APIs was received, the computer adds the selected set of Web APIs to the context of the application to generate a new context of the application. The computer sends a display of a relationship among the set of added Web APIs to the new context of the application to the client device via the network. According to other illustrative embodiments, a computer system and a computer program product for recommending Web API requirements for a context of an application are provided.

BRIEF DESCRIPTION OF THE DRAWINGS

FIG. 3 is a diagram of an example of a graph-based data model in accordance with an illustrative embodiment;

FIG. 4 is a diagram of an example of Web API node data in accordance with an illustrative embodiment; and FIGS. 5A and 5B are a flowchart illustrating a process for providing Web API recommendations for a context of an application in accordance with an illustrative embodiment.

DETAILED DESCRIPTION

Figure 1:
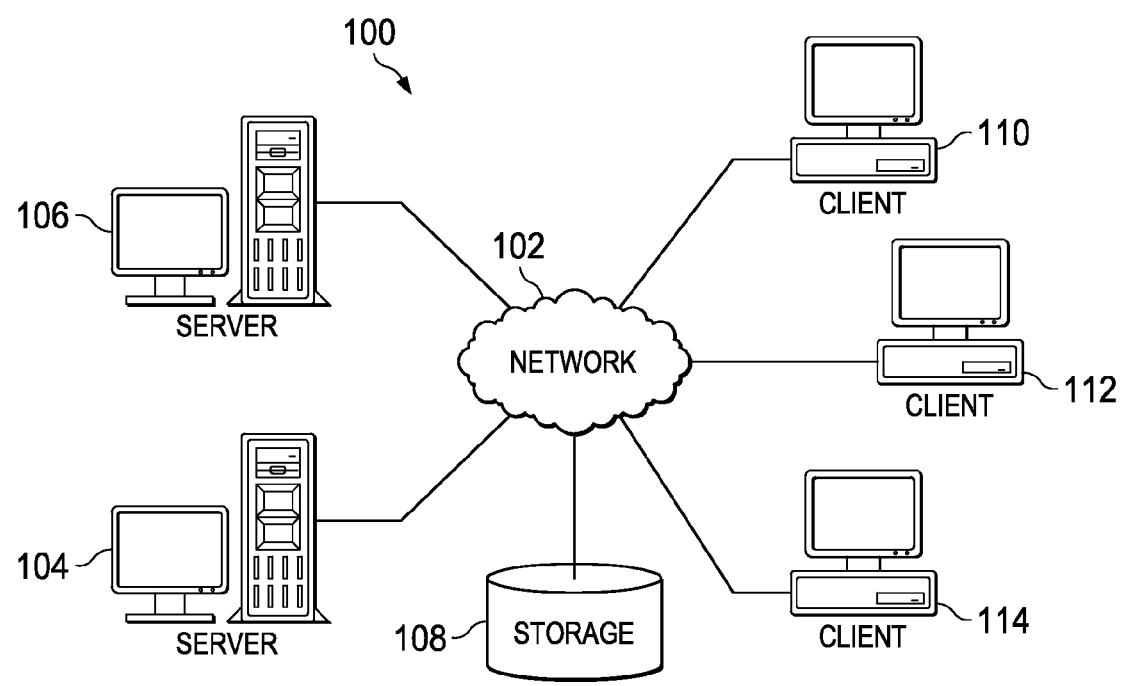
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
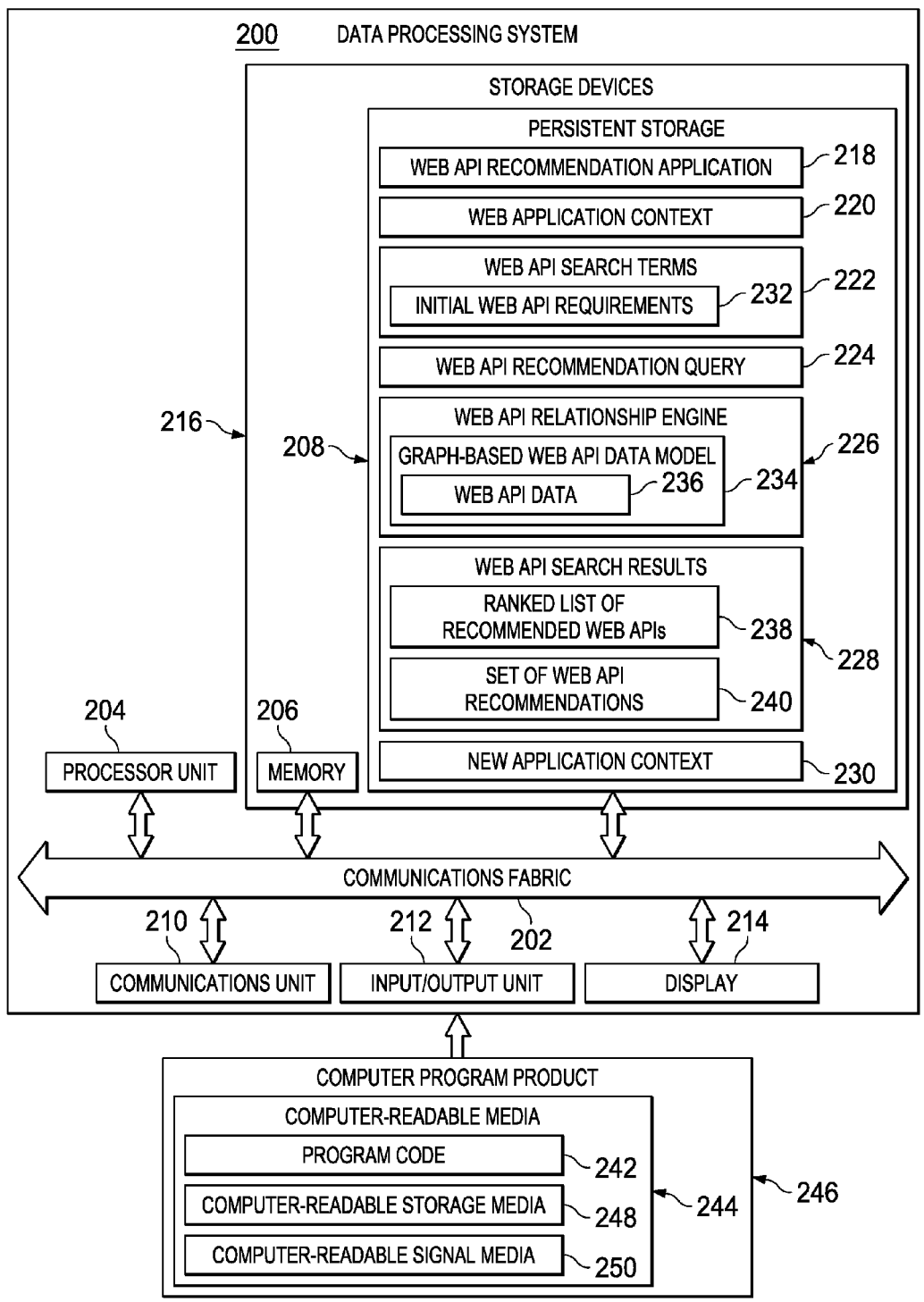
FIG. 2 is a diagram of a data processing system in which illustrative embodiments may be implemented.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more Web API recommendation services to software application developers of registered client devices. A Web API recommendation service is a process that provides a software application developer with sets of one or more Web APIs recommendations while developing a Web-based software service application within a particular context, including attributes of the recommended Web APIs and potential new Web API requirements that the software application developer may consider to further refine the Web-based software service application. The context of the software application is a set of aspects related to the development and execution of the particular software application. For example, the set of aspects related to the development and execution of the particular software application may include legal requirements of the application, performance requirements of the application, business goals and functions associated with the application, target audience of the application, goal of the application, functionality of the application, et cetera.

Client device 110, client device 112, and client device 114 also connect to network 102. Client devices 110, 112, and 114 are registered clients to server 104 or server 106. In the depicted example, server 104 or server 106 may provide information, such as boot files, operating system images, software applications, Web APIs, specific portions of Web APIs, and Web API recommendations to client devices 110, 112, and 114.

In this example, client devices 110, 112, and 114 are computers, such as desktop computers or network computers with wire or wireless communication links to network 102. However, it should be noted that client devices 110, 112, and 114 are intended as examples only. In other words, client devices 110, 112, and 114 may include laptop computers, tablet computers, handheld computers, smart phones, and personal digital assistants, for example.

Storage 108 is a network storage device capable of storing data in a structured format or unstructured format. Storage 108 may provide storage of a plurality of different client device user names and associated identification numbers; user profiles; and user account information associated with the Web API recommendation service. Storage 108 also may store software applications; Web APIs, specific portions of Web APIs, Web API usage histories for development and refinement of different application contexts, attributes of each of the different Web APIs, relationships and dependencies between the different Web APIs, graph-based Web API data models, previous Web API recommendations for particular software service application contexts, and the like. Further, storage unit 108 may store other data, such as authentication or credential data that may include user names, passwords, and biometric data associated with the plurality of users (e.g., software application developers) and system administrators. It should be noted that storage unit 108 may store any data that may be utilized by the Web API recommendation service.

In addition, it should be noted that network data processing system 100 may include any number of additional server devices, client devices, and other devices not shown. Program code located in network data processing system 100 may be stored on a computer readable storage medium and may be downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores Web API recommendation application 218, application context 220, Web API search terms 222, Web API recommendation query 224, Web API relationship engine 226, Web API search results 228, and new application context 230. Web API recommendation application 218 is a software program that provides the Web API recommendation service to a software application developer while developing a software application, including attributes of recommended Web APIs and potential new Web API requirements that the software application developer may consider to further refine the software application. Application context 220 is a set of aspects related to the development and execution of the particular software application, such as, for example, legal requirements of the application, performance requirements of the application, business goals and functions associated with the application, target audience of the application, goal of the application, functionality of the application, et cetera. Web API recommendation application 218 receives initial application context 220 from the software application developer via a network using a registered client device, such as client device 110 in FIG. 1.

In addition, Web API recommendation application 218 also receives Web API search terms 222 from the software application developer. Web API search terms 222 correspond to application context 220 and include initial Web API requirements 232 for the context of the application being developed or refined. Initial Web API requirements 232 for the context of the application may include, for example, an initial list of required Web APIs selected by the software application developer for the context of the application (i.e., application context 220), a category from which to select and recommend other Web APIs for the context of the application, full-text search terms used to search for other recommended Web APIs for the context of the application, attributes or characteristics, such as quality of service (QoS) and terms of service (ToS), for other recommended Web APIs, et cetera.

After receiving Web API search terms 222, which include initial Web API requirements 232, Web API recommendation application 218 defines Web API recommendation query 224 for the context of the application. Web API recommendation query 224 includes, for example, Web API search terms 222 and the initial list of required Web APIs selected by the software developer for the context of the application. Web API recommendation application 218 sends Web API recommendation query 224 to Web API relationship engine 226. Web API relationship engine 226 identifies a list of recommended Web APIs for the context of the application using graph-based Web API data model 234. Graph-based Web API data model 234 is a model in the form of a graph structure, which includes Web API data 236 for the context of the application. Web API data 236 includes, for example, names and descriptions of Web APIs, attributes of the Web APIs, and relationships between the Web APIs for the context of the application. However, it should be noted that graph-based Web API data model 234 may represent a plurality of different graph-based Web API data models for a plurality of different contexts for a plurality of different applications.

Web API relationship engine 226 sends Web API search results 228 to Web API recommendation application 218. Web API search results 228 contains ranked list of recommended Web APIs 238 for the context of the application and set of Web API recommendations 240. Ranked list of recommended Web APIs 238 is a list of recommended Web APIs ranked by order of relationship to the context of the application. For example, Web API relationship engine 226 will list a recommended Web API with a highest or strongest relationship to the context of the application first in ranked list of recommended Web APIs 238. Set of Web API recommendations 240 may include information, such as, for example, instructions on how to use one or more of the Web APIs within ranked list of recommended Web APIs 238 or what data format to use with the Web APIs.

Afterward, Web API recommendation application 218 sends Web API search results 228 to the software application developer for review and possible selection of recommended Web APIs within ranked list of recommended Web APIs 238. API recommendation application 218 may then add any recommended Web API selections made by the software application developer to application context 220 to generate new application context 230. New application context 230 is a refined or modified version of the application containing the added Web APIs. Subsequently, Web API recommendation application 218 may iterate through the process for new application context 230 to further refine new application context 230 by recommending further Web APIs to add to new application context 230.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that the use of Web-based service APIs is becoming more prevalent. As the number of Web-based service APIs continues to grow, more companies will utilize Web-based service architectures. As a result, a software application developer may continually change a set of Web APIs consumed by a Web-based service application based on feedback by users of the Web-based service, QoS defined for the Web-based service, ToS defined for the Web-based service, change in Web API requirements for the Web-based service, et cetera. Currently, Web API requirements are collected via Web search using a standard search engine and Web API selection is usually done individually without regard for the entire context of the application. Consequently, compatibility between selected Web APIs is not addressed and integration gaps are difficult to identify using current methods.

Illustrative embodiments support a software application developer in continuously defining and redefining the requirements regarding the use of Web APIs, and the implied integration aspects required to build an application within a particular context. Illustrative embodiments enable an iterative approach to define Web API requirements when using a set of Web APIs, and leveraging the attributes and relationships among the set of Web APIs required for the context of the application. Illustrative embodiments continuously adapt Web API requirements for the context of the application based on the Web API recommendations issued by the illustrative embodiments. A Web API recommendation may instruct a software application developer to use a particular data format with a recommended Web API or to use a particular authorization method with the recommended Web API, for example.

In addition, illustrative embodiments continuously update Web API recommendations for the context of an application as illustrative embodiments continuously adapt the Web API requirements for the context of the application. Illustrative embodiments assemble a set of recommended Web APIs, along with their associated attributes, characteristics, components, frameworks, and guidelines, and potential Web API requirements, to build the application within the particular context. Web API requirements may include, for example, which Web APIs to use for a particular context of an application, which specific portions of Web APIs to use, pointers to software development kits for the particular context of the application, and attributes, such as QoS and ToS, for each recommended Web API. An application context results from iteratively defining and adapting Web API requirements and accepting Web API recommendations.

Illustrative embodiments build upon Web API recommendations for further refinement by: 1) filtering a list of recommended Web APIs to reduce a number of recommended Web APIs based on functionality, such as, for example, Web API category or Web API term and full-text search terms on Web API names and attributes, and non-functional requirements, such as ToS and QoS, and the like; and 2) ranking the filtered list of Web APIs based on the relationships to already selected Web APIs, such as, for example, common historic usage, common characteristics or attributes, matching data formats, and the like. Thus, illustrative embodiments create a control point that attracts software application developers to initiate their application development and iterative refinement.

Thus, illustrative embodiments provide a computer-implemented method, computer system and computer program product for refining Web API requirements for developing a software application. Web API requirements include functionalities or non-functionalities, as well as specific Web APIs to use in the software application. The requirements reflect the context of the application in development. The requirements initially consist of a set of developer-defined search terms for functionalities and/or non-functionalities. A developer states these search terms using a client device and sends them to a server computer via a network. Based on these search terms, the server computer sends a ranked list of recommended Web APIs to the client device via a network, including information on their functionalities and non-functionalities and potential requirements. In response to receiving the ranked list of recommended Web APIs, the developer adapts the requirements for functionalities or non-functionalities by updating the search terms and creates or adapts a set of selected Web APIs from the ranked list of recommended Web APIs. The developer sends back the updated requirements to the server computer via a network. The server computer, again, sends recommended Web APIs to the client device via the network, now including a display of the relationships among the set of selected Web APIs made by the developer and the recommended Web APIs made by the server computer. Again, the developer may then adapt requirements, including the set of selected Web APIs, based on the recommendations, resulting in an iterative process.

With reference now to FIG. 3, a diagram of an example of a graph-based Web API data model is depicted in accordance with an illustrative embodiment. Graph-based Web API data model 300 may be, for example, graph-based Web API data model 234 in FIG. 2. Web API data, such as Web API data 236 in FIG. 2, are represented in the graph structure. For example, each node in the graph structure may represent a corresponding Web API or a specific portion of a Web API, which is referred to as an endpoint "EP". A Web API endpoint addresses a specific issue, task, or process with regard to the context of the application. A Web API recommendation application, such as, for example, Web API recommendation application 218 in FIG. 2, takes as input current Web API requirements and bases its Web API recommendations on traversing relationships within the graph structure of graph-based Web API data model 300.

In addition, it should be noted that other nodes within the graph structure of graph-based Web API data model 300 may represent, for example, a user, an application or mashup, common characteristics or attributes of Web APIs or specific portions of Web APIs, as well as other information. A mashup is a Web application that combines the use of multiple Web APIs. A Web API may be a combination of multiple Web API endpoints.

Graph-based Web API data model 300 includes names and descriptions of Web APIs in corresponding Web API nodes, such as, for example, Web API 1 302 and Web API 2 304, within the graph structure because the names and descriptions are unique to each corresponding Web API. A specific example of Web API node data, such as name and description of a Web API, is shown in FIG. 4. Also, it should be noted that a typical graph-based Web API data model would include more nodes and relationships than shown in the example of FIG. 3. FIG. 3 is only intended as a simple example.

Graph-based Web API data model 300 may store common Web API characteristics or attributes, such as, for example, Web API QoS and ToS, in their own node, such as common characteristic node C1 306, to which multiple Web API nodes have a relationship. For example, Web API endpoint nodes EP1 312, EP3 316, and EP4 318 may have a relationship to common characteristic node C1 306. As a result, graph-based Web API data model 300 does not store the common characteristic in Web API endpoint nodes EP1 312, EP3 316, and EP4 318 to decrease or eliminate data redundancy. Instead, graph-based Web API data model 300 generates the relationships between common characteristic node C1 306 and Web API endpoint nodes EP1 312, EP3 316, and EP4 318 having a relationship to the common characteristic or attribute stored in node C1 306.

Graph-based Web API data model 300 denotes usage of a Web API by generating a relationship between the node corresponding to the particular Web API and a node corresponding to an application, such as, for example, mashup M1 308. For example, graph-based Web API data model 300 may denote use of Web API_y by generating a relationship in the graph structure such as Web API_y - - - relationship - - - >Application_z. Consequently, a search of graph-based Web API data model 300 for required or recommended Web APIs for a particular context of Application_z relies on: 1) matching Web API names and descriptions; and 2) looking for relationships to required Web API attributes. Recommendation and ranking of Web APIs relies on looking for direct and indirect relationships between Web APIs within graph-based Web API data model 300.

In the example of FIG. 3, user U1 310 wants to know which Web API endpoints in graph-based Web API data model 300 have been used with Web API endpoint EP1 312. In this example, Web API endpoint EP1 312 has a relation with mashup M1 308, which in turn has a relation with Web API endpoint EP2 314 and Web API endpoint EP3 316. As a result, graph-based Web API data model 300 may determine that Web API endpoints EP2 314 and EP3 316 have been used with Web API endpoint EP1 312 and may recommend that Web API endpoints EP2 314 and EP3 316 be added to mashup M1 308 to refine or modify the context of mashup M1 308.

With reference now to FIG. 4, a diagram of an example of Web API node data is depicted in accordance with an illustrative embodiment. Web API node data 400 may be, for example, Web API data 236 in FIG. 2. In this example, Web API node data 400 includes uniform resource locator (URL) 402, creation date 404, customer identification (ID) 406, description 408, name 410, type 412, ID 414, and type 416. A Web API relationship engine, such as, for example, Web API relationship engine 226 in FIG. 2, uses Web API node data 400, which includes name 410 and description 408, to uniquely identify a corresponding Web API, such as, for example, Web API 1 302 in FIG. 3.

Figure 5B:
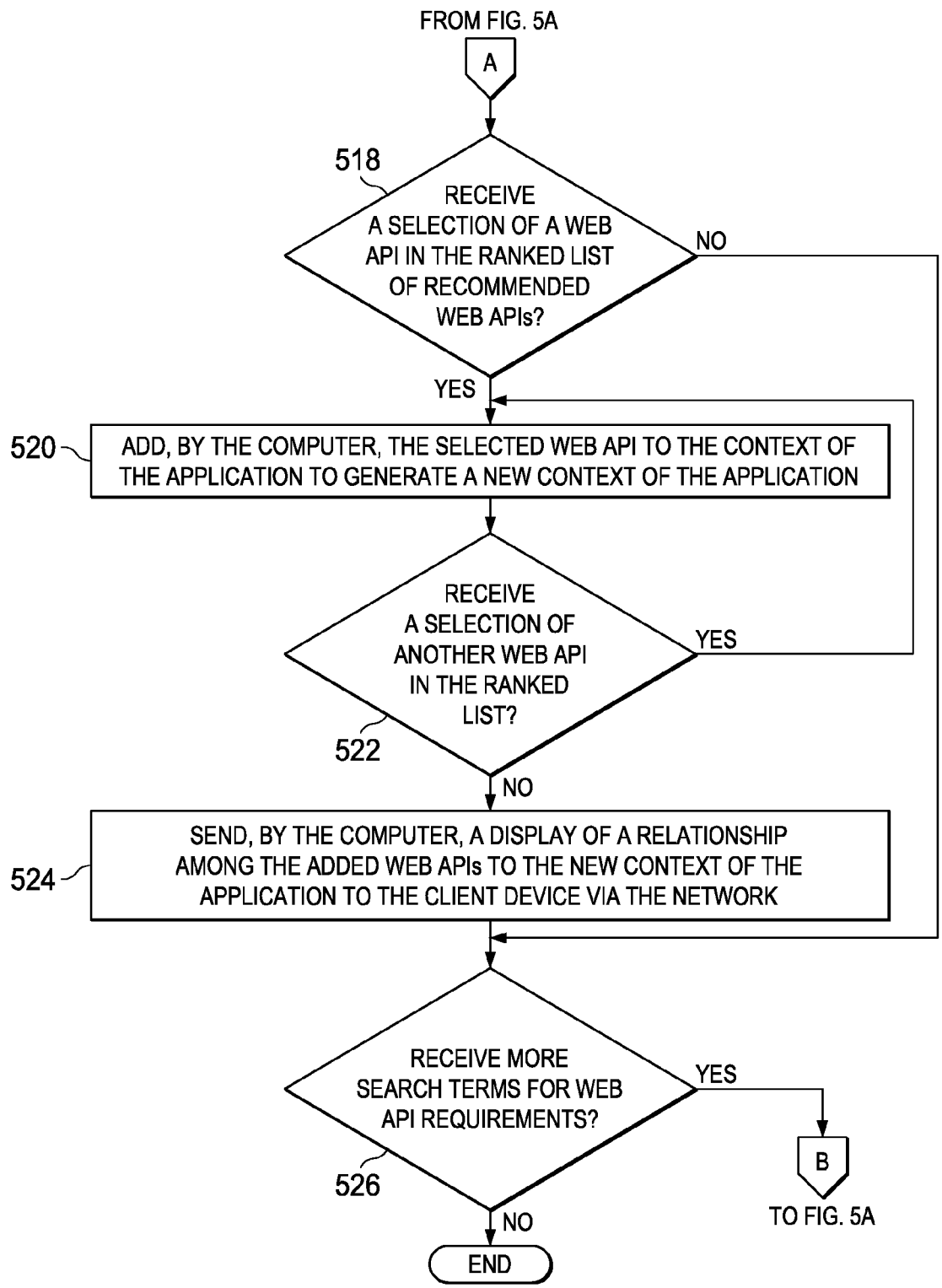

With reference now to FIGS. 5A and 5B, a flowchart illustrating a process for providing Web API recommendations for a context of an application is shown in accordance with an illustrative embodiment. The process shown in FIGS. 5A and 5B may be implemented in a computer, such as data processing system 200 in FIG. 2.

The process begins when the computer receives a context of an application from a client device via a network (step 502). The context of the application may be, for example, application context 220 in FIG. 2. The client device and network may be, for example, client device 110 and network 102 in FIG. 1.

In addition, the computer receives search terms that include initial Web API requirements for the context of the application from the client device via the network (step 504). The search terms and initial Web API requirements may be, for example, Web API search terms 222 and initial Web API requirements 232 in FIG. 2. Also, it should be noted that the context of the application, search terms, and initial Web API requirements are sent by a software application developer using the client device.

After receiving the search terms and initial Web API requirements for the context of the application in step 504, the computer defines a Web API recommendation query that includes the search terms and selected Web APIs for the context of the application (step 506). The selected Web APIs for the context of the application are found in the initial Web API requirements sent by the software application developer. The Web API recommendation query may be, for example, Web API recommendation query 224 in FIG. 2.

The computer sends the Web API recommendation query for the context of the application to a Web API relationship engine that contains a graph-based Web API data model of Web API descriptions, attributes, and relationships (step 508). The Web API relationship engine, graph-based Web API data model, and Web API data may be, for example, Web API relationship engine 226, graph-based Web API data model 234, and Web API data 236 in FIG. 2. Subsequently, the computer receives a search result from the Web API relationship engine containing a list of recommended Web APIs for the context of the application (step 510). The search result may be, for example, Web API search results 228 in FIG. 2.

Then, the computer filters the list of recommended Web APIs for the context of the application based on the attributes of the recommended Web APIs in the list (step 512). Further, the computer ranks the recommended Web APIs in the filtered list based on the relationships of the recommended Web APIs to the context of the application (step 514). The ranked list of recommended Web APIs may be, for example, ranked list of recommended Web APIs 238 in FIG. 2. The computer sends the ranked list of recommended Web APIs and a set of Web API recommendations regarding the context of the application to the client device via the network (step 516). The set of Web API recommendations may be, for example, set of Web API recommendations 240 in FIG. 2.

Afterward, the computer makes a determination as to whether the computer received a selection of a Web API in the ranked list of recommended Web APIs (step 518). If the computer determines that a selection of a Web API in the ranked list of recommended Web APIs was not received, no output of step 518, then the process proceeds to step 526. If the computer determines that a selection of a Web API in the ranked list of recommended Web APIs was received, yes output of step 518, then the computer adds the selected Web API to the context of the application to generate a new context of the application (step 520). The new context of the application may be, for example, new application context 230 in FIG. 2.

Subsequent to adding the selected Web API to the context of the application in step 520, the computer makes a determination as to whether the computer received a selection of another Web API in the ranked list (step 522). If the computer determines that a selection of another Web API in the ranked list was received, yes output of step 522, then the process returns to step 520 where the computer adds the other selected Web API to the context of the application. If the computer determines that a selection of another Web API in the ranked list was not received, no output of step 522, then the computer sends a display of a relationship among the added Web APIs to the new context of the application to the client device via the network (step 524). The software application developer using the client device may use the display of the relationship among the added Web APIs to develop further refinements to the context of the application.

Then, the computer makes a determination as to whether the computer received more search terms for Web API requirements (step 526). If the computer determines that more search terms for Web API requirements were received, yes output of step 526, then the process returns to step 506 where the computer defines another Web API recommendation query. If the computer determines that more search terms for Web API requirements were not received, no output of step 526, then the process terminates thereafter.

Thus, illustrative embodiments provide a computer-implemented method, computer system, and computer program product for providing Web API recommendations for a context of an application. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for providing Web Application Programming Interface (API) recommendations for a context of an application, the computer system comprising;
    a bus system;
    a storage device connected to the bus system, wherein the storage device stores program instructions; and
    a processor connected to the bus system, wherein the processor executes the program instructions to:
    send a ranked list of Web APIs recommended and a set of Web API recommendations regarding the context of the application, as a result of input containing current Web API requirements and the set of Web API recommendations determined by traversal of relationships within a graph structure of a graph-based Web API data model, to a client device via a network, wherein each node in the graph structure represents an end point including one of a corresponding Web API, a specific portion of a Web API, common Web API characteristics and Web API attributes, and wherein Web APIs recommended in the ranked list of Web APIs recommended are ranked based on the relationships of the Web APIs recommended to the context of the application;
    wherein set of Web API recommendations include instructions on how to use the Web APIs within the ranked list of Web APIs;
    wherein the relationships of the Web APIs recommended to the context of the application include matching data formats;
    add a selected set of Web APIs to the context of the application to generate a new context of the application in response to determining that a selection of a set of Web APIs in the ranked list of Web APIs recommended was received; and
    send a display of a relationship among the selection of the set of Web APIs in the ranked list of Web APIs recommended added to the new context of the application to the client device via the network.

2. The computer system of claim 1, wherein the processor further executes the program instructions to:
    receive the context of the application from the client device via the network;
    receive search terms that include initial Web API requirements as the current Web API requirements for the context of the application from the client device via the network; and
    define a Web API recommendation query that includes the search terms and the selection of the set of Web APIs for the context of the application.

3. The computer system of claim 2, wherein the initial Web API requirements for the context of the application include at least one of an initial list of required Web APIs selected by a software application developer for the context of the application, a Web API category from which to select and recommend other Web APIs for the context of the application, full-text search terms used to search the graph-based Web API data model for the other Web APIs recommended for the context of the application, and one or more attributes corresponding to the other Web APIs recommended.

4. The computer system of claim 1, wherein the processor further executes the program instructions to:
    send a Web API recommendation query for the context of the application to a Web API relationship engine that contains the graph-based Web API data model comprising Web API descriptions, attributes, and relationships;

match Web API names and descriptions and identify relationships to required Web API attributes in the context of the application using the graph-based Web API data model by the Web API relationship engine; and receive a search result from the Web API relationship engine containing a list of Web APIs recommended for the context of the application.

5. A computer program product for providing Web Application Programming Interface (API) recommendations for a context of an application, the computer program product comprising a computer readable storage medium having program instructions embodied therewith, the program instructions executable by a computer to cause the computer to perform a method comprising:

sending, by the computer, a ranked list of Web APIs recommended and a set of Web API recommendations regarding the context of the application to a client device via a network, as a result of input containing current Web API requirements and the set of Web API recommendations determined by traversal of relationships within a graph structure of a graph-based Web API data model, wherein each node in the graph structure represents an end point including one of a corresponding Web API, a specific portion of a Web API, common Web API characteristics and Web API attributes, and wherein Web APIs recommended in the ranked list are ranked Web APIs recommended based on the relationships of the Web APIs recommended to the context of the application;

wherein set of Web API recommendations include instructions on how to use the Web APIs within the ranked list of Web APIs;

wherein the relationships of the Web APIs recommended to the con text of the application include matching data formats;

responsive to the computer determining that a selection of a set of Web APIs in the ranked list of Web APIs recommended was received, adding, by the computer, the selection of the set of Web APIs to the context of the application to generate a new context of the application; and sending, by the computer, a display of a relationship among the selection of the set of Web APIs in the ranked list of Web APIs recommended added to the new context of the application to the client device via the network.

6. The computer program product of claim 5 further comprising:

receiving, by the computer, the context of the application from the client device via the network;

receiving, by the computer, search terms that include initial Web API requirements as the current Web API requirements for the context of the application from the client device via the network; and defining, by the computer, a Web API recommendation query that includes the search terms and selected Web APIs for the context of the application.

7. The computer program product of claim 6, wherein the initial Web API requirements for the context of the application include at least one of an initial list of required Web APIs selected by a software application developer for the context of the application, a Web API category from which to select and recommend other APIs for the context of the application, full-text search terms used to search the graph-based Web API data model for other Web APIs recommended for the context of the application, and one or more attributes corresponding to the other Web APIs recommended.

8. The computer program product of claim 5 further comprising:

sending, by the computer, a Web API recommendation query for the context of the application to a Web API relationship engine that contains the graph-based Web API data model comprising Web API descriptions, attributes, and relationships;

match Web API names and descriptions and identify relationships to required Web API attributes in the context of the application using the graph-based Web API data model by the Web API relationship engine; and receiving, by the computer, a search result from the Web API relationship engine containing a list of Web APIs recommended for the context of the application.

9. The computer program product of claim 8 further comprising:

filtering, by the computer, the list of Web APIs recommended for the context of the application based on one or more attributes of the Web APIs in the list of Web APIs recommended to generate a filtered list.

10. The computer program product of claim 9 further comprising:

ranking, by the computer, one or more Web APIs recommended in the filtered list based on one or more relationships of the Web APIs recommended to the context of the application.

11. The computer program product of claim 10, wherein the one or more relationships of the Web APIs recommended include at least one of common historic usage, common attributes, and matching data formats.

12. The computer program product of claim 5, wherein the context of the application is a set of aspects related to development and execution of the application.

* * * * *